US011178095B1

(12) United States Patent
Goenka et al.

(10) Patent No.: US 11,178,095 B1
(45) Date of Patent: Nov. 16, 2021

(54) METHOD AND SYSTEM FOR THE ANALYSIS OF USER CONTENT AND INTERACTIONS TO DEFINE A CALL TO ACTION

(71) Applicant: VERIZON MEDIA INC., New York, NY (US)

(72) Inventors: Mohita Goenka, Santa Clara, CA (US); Hafeez Shaik, Milpitas, CA (US); Luis Alves, Sunnyvale, CA (US); Deepesh Mittal, Santa Clara, CA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 17/012,567

(22) Filed: Sep. 4, 2020

(51) Int. Cl.
*G06F 15/16* (2006.01)
*H04L 12/58* (2006.01)
*H04L 29/08* (2006.01)

(52) U.S. Cl.
CPC ............. *H04L 51/26* (2013.01); *H04L 51/18* (2013.01); *H04L 51/24* (2013.01); *H04L 67/22* (2013.01)

(58) Field of Classification Search
CPC ......... H04L 51/26; H04L 67/22; H04L 51/18; H04L 51/24; H04L 51/12; G06Q 10/107
USPC ........................................ 709/206, 207, 224
See application file for complete search history.

(56) References Cited

U.S. PATENT DOCUMENTS

| | | | |
|---|---|---|---|
| 2008/0162642 A1* | 7/2008 | Bachiri | H04L 67/306 709/206 |
| 2013/0241918 A1* | 9/2013 | Satyan | G06F 9/542 345/418 |
| 2014/0082094 A1* | 3/2014 | Bilgen | G06Q 50/01 709/206 |
| 2014/0173009 A1* | 6/2014 | Denise | G06Q 10/107 709/206 |
| 2017/0093766 A1* | 3/2017 | Nagaralu | H04L 51/066 |
| 2019/0109917 A1* | 4/2019 | Milanese | H04M 1/00 |
| 2020/0380408 A1* | 12/2020 | Sridhar | G06Q 10/107 |
| 2020/0396328 A1* | 12/2020 | Salminen | H04M 1/72454 |
| 2021/0049297 A1* | 2/2021 | Jiang | G06F 21/6245 |
| 2021/0081459 A1* | 3/2021 | Chung | G06F 16/3326 |

* cited by examiner

*Primary Examiner* — Johnny B Aguiar
(74) *Attorney, Agent, or Firm* — James J. DeCarlo; Greenberg Traurig, LLP

(57) ABSTRACT

The disclosed embodiments relate to processing of notifications displayed on computing devices. In one embodiment, a method is disclosed comprising receiving a notification and querying at least one activity database that records historical interactions of a user. The method then receives a priority indicator in response to the querying and determines whether the priority indicator indicates a high priority. If so, the method generates, and in some embodiments displays, a second notification.

15 Claims, 11 Drawing Sheets

Notification Activity Database 210

| Conversation ID | Sender | Action | Priority |
| --- | --- | --- | --- |
| 123 | joe@example.com | Clicked | HIGH |
| 125 | jane@example.com | Clicked | HIGH |
| 127 | no-reply@store.com | Ignored | LOW |

Message Activity Database 212

| Conversation ID | Sender | Action | Priority |
| --- | --- | --- | --- |
| 123 | joe@example.com | Read | HIGH |
| 125 | jane@example.com | Star | HIGH |
| 127 | no-reply@store.com | Delete | LOW |
| 129 | bob@example.com | Triage | LOW |
| 131 | joe@example.com | Reply | HIGH |

Contact Activity Database 214

| ID | Contact | Classification |
| --- | --- | --- |
| 1 | joe@example.com | TOP |
| 2 | jane@example.com | TOP |
| 3 | no-reply@store.com | IGNORED |
| 4 | bob@example.com | IGNORED |

CTA Activity Database 216

| Type | Sender | Category | User ID | Action |
| --- | --- | --- | --- | --- |
| Booking Conf. | Canoe.com | Travel | cc@canoe.com | Manage Booking |
| Receipt | Jungle.com | Shopping | rewards@jungle.com | View Rewards |
| Receipt | Waypoint.com | Shopping | orders@waypoint.com | Call Customer Care |

FIG. 4

METHOD AND SYSTEM FOR THE ANALYSIS OF USER CONTENT AND INTERACTIONS TO DEFINE A CALL TO ACTION

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

Currently, application developers use notifications to present timely information to users of computing devices. On mobile platforms, notifications generally take the form of a banner presented, for example, temporarily at the top of the mobile device screen. Similar constructs exist on laptop/desktop computer devices as well as other types of computing devices.

Notifications often present timely content that is architected to generate a response from the user. For example, an email application may present a notification for a new email message, which, when clicked, displays the message. As another example, a game may present a notification that entices a user to play the game by presenting an offer. In general, a notification (or content therein) that is designed to elicit a user response is referred to as a "call to action" (CTA).

In most applications, CTAs are generated based on the content of a notification.

BRIEF SUMMARY

The disclosed embodiments describe methods, devices, systems, and computer-readable media for manipulating a digital notification before display on a client device. As will be described, some embodiments may be performed entirely on a client device (e.g., mobile phone or tablet) while, in other embodiments, some, or all, of the functionality described herein are performed on a server computer. The disclosed embodiments build one or more activity databases that classify user interactions with digital content (e.g., email, messages, other notifications, etc.) as high or low priority. The disclosed embodiments then use these databases to classify new notifications as high or low priority notifications in real-time or near real-time. Higher priority notifications are displayed while historically lower priority notifications are ignored. In some embodiments, a second notification is generated for high priority messages based on past, successful calls to action, thus improving the usability of notifications. For example, a commonly taken action for a notification may be added to the original notification to allow one-click access to the action.

In one embodiment, a method is disclosed comprising receiving, by a processor, a notification; querying, by the processor, at least one activity database, the activity database comprising data regarding historical interactions of a user; receiving, by the processor, a priority indicator in response to the querying; determining, by the processor, that the priority indicator indicates a high priority; and generating, by the processor, a second notification in response to determining that the priority indicator indicates a high priority.

In another embodiment, a non-transitory computer-readable storage medium for tangibly storing computer program instructions capable of being executed by a processor is disclosed, the computer program instructions defining the steps of receiving, by the processor, a notification; querying, by the processor, at least one activity database, the activity database comprising data regarding historical interactions of a user; receiving, by the processor, a priority indicator in response to the querying; determining, by the processor, that the priority indicator indicates a high priority; and generating, by the processor, a second notification in response to determining that the priority indicator indicates a high priority.

In another embodiment, a device is disclosed comprising a processor; and a storage medium for tangibly storing thereon program logic for execution by the processor, the stored program logic comprising: logic, executed by the processor, for receiving a notification; logic, executed by the processor, for querying at least one activity database, the activity database comprising data regarding historical interactions of a user; logic, executed by the processor, for receiving a priority indicator in response to the querying; logic, executed by the processor, for determining that the priority indicator indicates a high priority; and logic, executed by the processor, for generating a second notification in response to determining that the priority indicator indicates a high priority.

These and various other embodiments are described in more detail below.

BRIEF DESCRIPTION OF THE DRAWINGS

FIG. 4 is a block diagram of a database scheme used by activity databases and queried to enhance notifications according to some embodiments of the disclosure.

DETAILED DESCRIPTION

Figure 1:
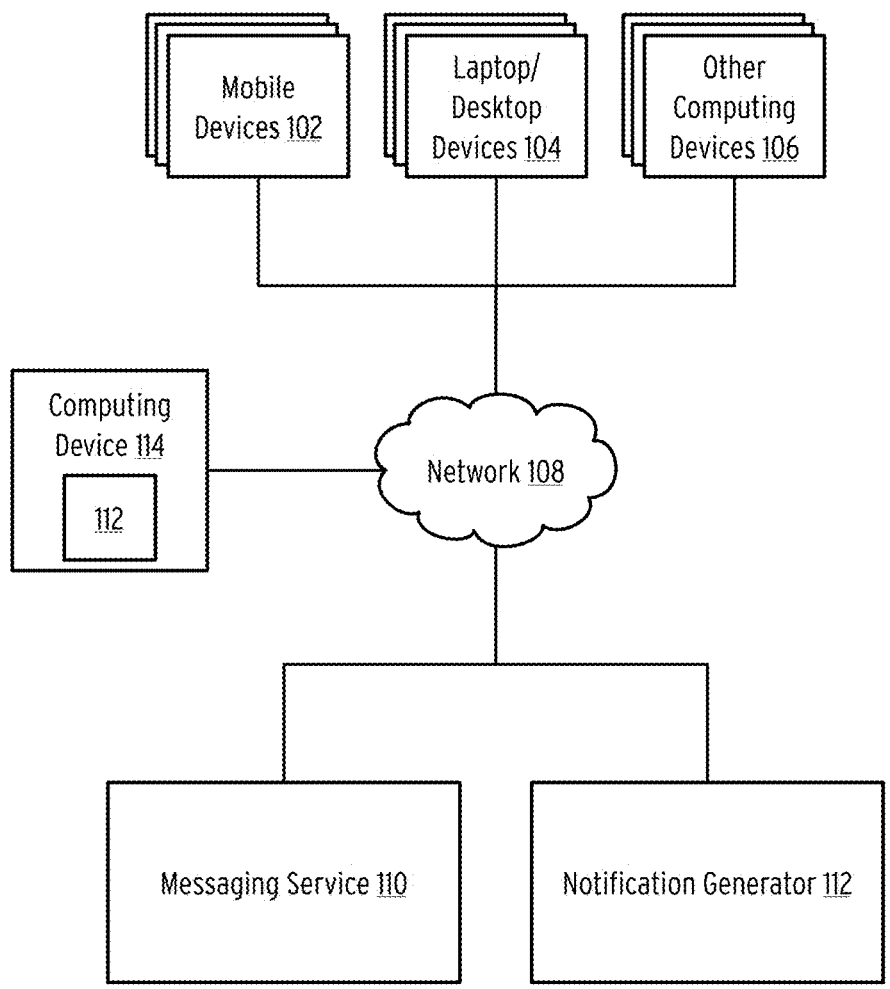
FIG. 1 is a block diagram of a system for enhancing notifications according to some embodiments of the disclosure.

FIG. 1 is a block diagram of a system for enhancing notifications according to some embodiments of the disclosure.

In the illustrated embodiment, mobile devices (102), laptop/desktop devices (104), and various other computing devices (106) are connected to a messaging service (110) via a network (108). In the illustrated embodiment, mobile devices (102), laptop/desktop devices (104), and various other computing devices (106) may comprise devices similar to the device depicted in FIG. 6. Additionally, messaging service (110) may comprise one or more server devices similar to the computing device depicted in FIG. 6. The network (108) may comprise a wide area network such as the Internet or other network technology.

In the illustrated embodiment, the messaging service (110) may comprise an email service, a chat/instant message service, or generally any service that facilitates digital communications between devices. In general, the messaging service (110) stores messages associated with user accounts and ultimately pushes messages to local applications running on the devices (102, 104, 106, 114).

In addition to receiving message content from messaging service (110), the devices (102, 104, 106, 114) are also capable of generating and displaying notifications. As used herein, a notification comprises a user interface element that displays ephemeral or out of band information. As used herein out of band information refers to information that is not necessarily related to the currently displayed application. Notifications often take the form of briefly displayed banners that include text, image, and interactive content or user interface elements.

In some embodiments, notifications are pushed to the device (102, 104, 106, 114) by a messaging service (110) or other remote computing devices. In these embodiments, the messaging service (110) may utilize a notification generator (112) to generate the notifications. Alternatively, or in conjunction with the foregoing, the devices (102, 104, 106, 114) may generate notifications locally. In some embodiments, a local notification may be generated based on remote data. For example, the messaging service (110) may push a message to the devices (102, 104, 106, 114), and the devices (102, 104, 106, 114) use the message to build and display a notification about the new message. As illustrated via a computing device (114), in some embodiments, a client device may include a locally running notification generator (112) to format notifications.

The notification generator (112) may be included in the messaging service (110) or, as illustrated, may comprise a separate computing device. The notification generator (112) is configured to monitor user interactions with messages or notifications and build activity databases that may be used to format future notifications in real-time or near real-time.

In some embodiments, clients (102, 104, 106) issue network requests to messaging service (110) or notification generator (112) reporting actions taken with messages or notifications. The notification generator (112) uses these messages to construct the activity databases as will be described in more detail herein and, in more detail, in FIGS. 2, 3, and 5B through 5E.

After building the activity databases, the notification generator (112) receives incoming notifications. In response, the method queries the databases to predict whether the incoming notification is high or low priority based on user interactions recorded in the activity databases. Details of these operations are described more fully in FIGS. 2, 3, 5A, and 5F.

Figure 2:
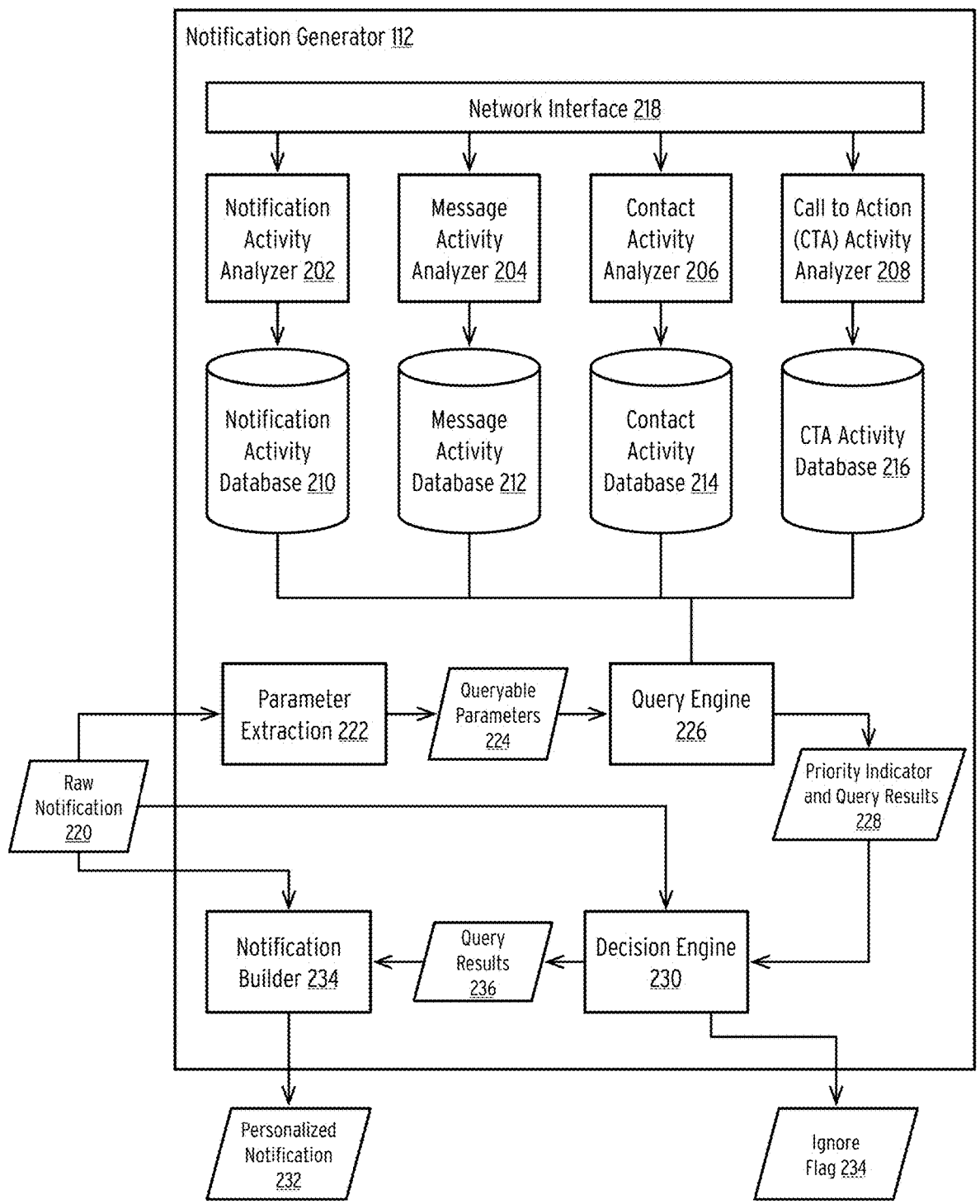
FIG. 2 is a block diagram of a device for enhancing notifications according to some embodiments of the disclosure.

FIG. 2 is a block diagram of a device for enhancing notifications according to some embodiments of the disclosure.

In the illustrated embodiment, the notification generator (112) depicted in FIG. 1 includes a network interface (218). In the illustrated embodiment, the network interface (218) is configured to receive data including, but not limited to, notification, message, contact, and action data. Data received over the interface (218) is processed by analyzers (202-208). In the illustrated embodiment, a notification activity analyzer (202) reads notification data off the bus (218) and processes the notifications as described in FIG. 5B. In the illustrated embodiment, a message activity analyzer (204) reads message data off the bus (218) and processes the messages as described in FIG. 5C. In the illustrated embodiment, a contact activity analyzer (206) reads contact data off the bus (218) and processes the contacts as described in FIG. 5D. In the illustrated embodiment, a CTA activity analyzer (208) reads action data off the bus (218) and processes the actions as described in FIG. 5E. Details of those FIGS. 5B through 5E are not repeated herein.

The various analyzers write processed data to corresponding databases (210-216). In one embodiment, the databases (210-216) comprise relational databases such as MySQL or PostgreSQL. In other embodiments, the databases (210-216) may comprise key-value data stores (e.g., Redis) or distributed databases (e.g., HBase). The specific type of database is not intended to be limiting. In general, the databases (210-216) should support ad hoc querying by query engine (226), as will be described below.

In addition to receiving data over the bus (218), the notification generator (112) receives raw notification (220) data. In one embodiment, this data is generated locally on a mobile device or by a server device in response to an event (e.g., a new message). A parameter extraction unit (222) receives the notification and extracts one or more properties from the notification, such as a sender identifier (e.g., email address or user name). The extracted parameters are transmitted to the query engine (226) and are referred to as query-able parameters (224). In the illustrated embodiment, the query engine (226) receives the query-able parameters (224) and generates one or more queries to retrieve data from databases (210-216). In one embodiment, the query engine (226) generates a query for each database (210-216) and combines the results of the queries to generate a priority indicator and query results (228). As described in more detail, the results returned from databases (210-216) comprise priority indicators stored in each database and related to the incoming notification.

As illustrated, the priority indicator and query results (228) are transmitted to a decision engine (230). The decision engine (230) analyzes the priority indicator and determines whether to return an ignore flag (234) or return a notification (232). In one embodiment, if the decision engine determines that the priority indicator indicates a low priority notification, the decision engine (230) may ignore the notification. In the illustrated embodiment, the decision engine (230) may return an ignore flag (234) so that the calling process is informed that processing is complete.

If the decision engine determines that the notification is a high priority notification, the decision engine forwards the query results to a notification builder (234). The notification builder (234) is described more fully in FIGS. 3 and 5F. In brief, the notification builder (234) generates a new notification (232) based on the original notification (220) as well as the query results. Specifically, the notification builder (234) uses the results obtained from the CTA activity database (216) to generate a personalized CTA to include in the notification.

Figure 3:
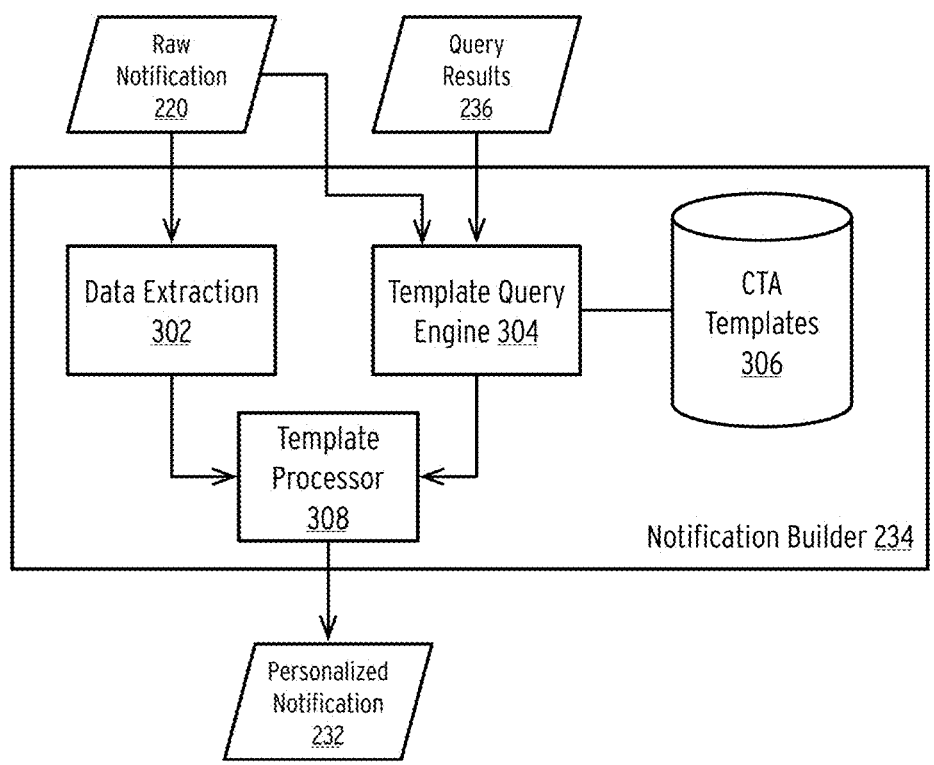
FIG. 3 is a block diagram of a device for generating new notifications according to some embodiments of the disclosure.
Figure 5A:
FIG. 5A is a flow diagram of a method for enhancing notifications according to some embodiments of the disclosure.
Figure 5B:
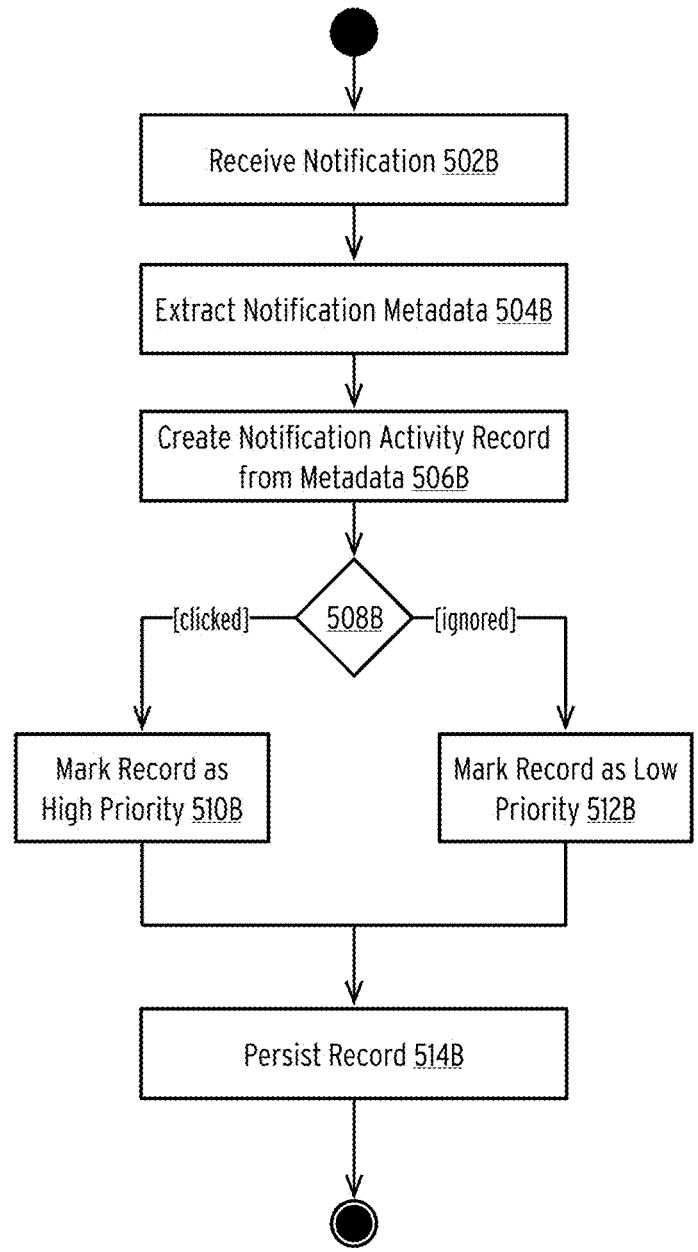
FIG. 5B is a flow diagram of a method for building a notification activity database according to some embodiments of the disclosure.
Figure 5C:
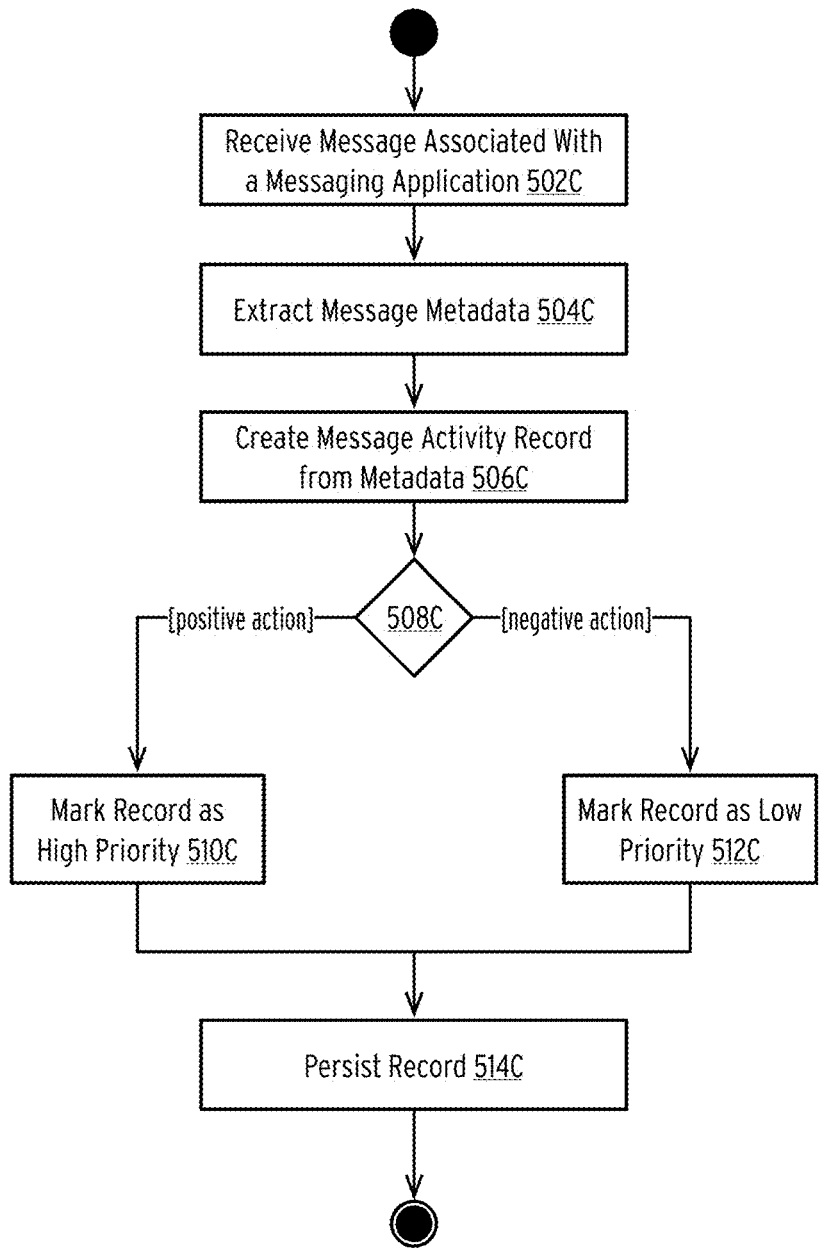
FIG. 5C is a flow diagram of a method for building a message activity database according to some embodiments of the disclosure.
Figure 5D:
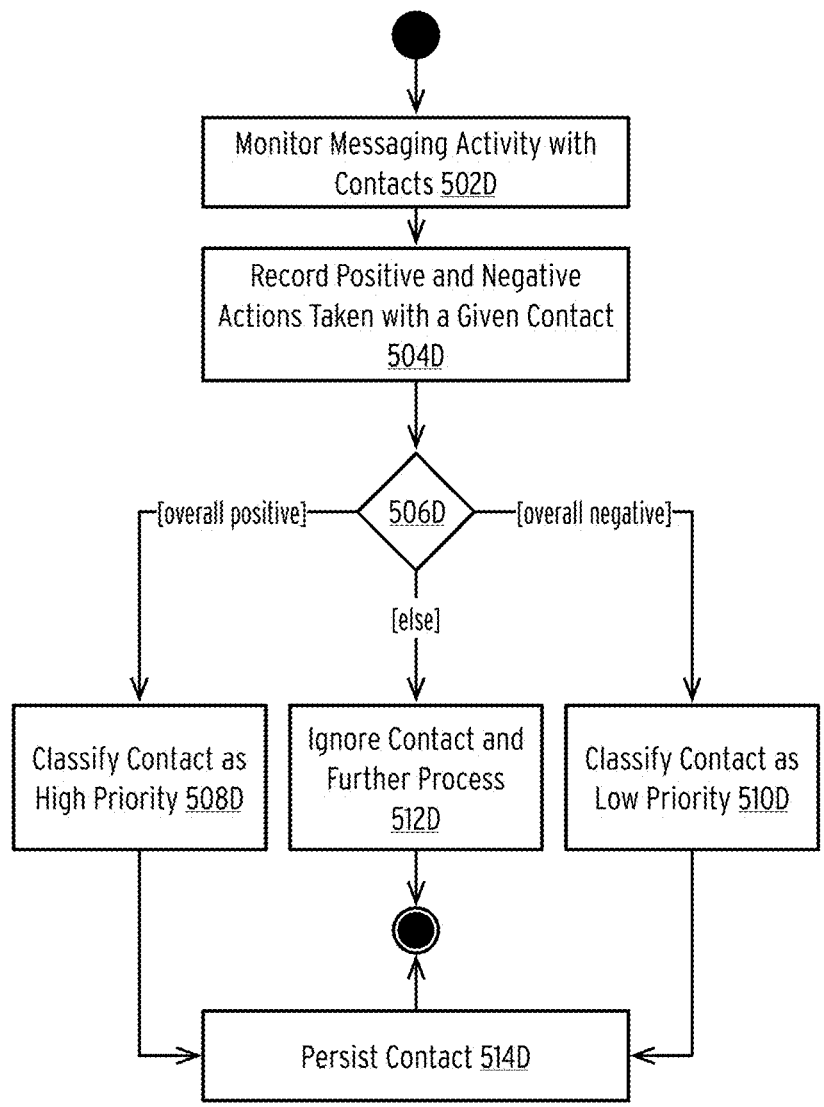
FIG. 5D is a flow diagram of a method for building a contact activity database according to some embodiments of the disclosure.
Figure 5E:
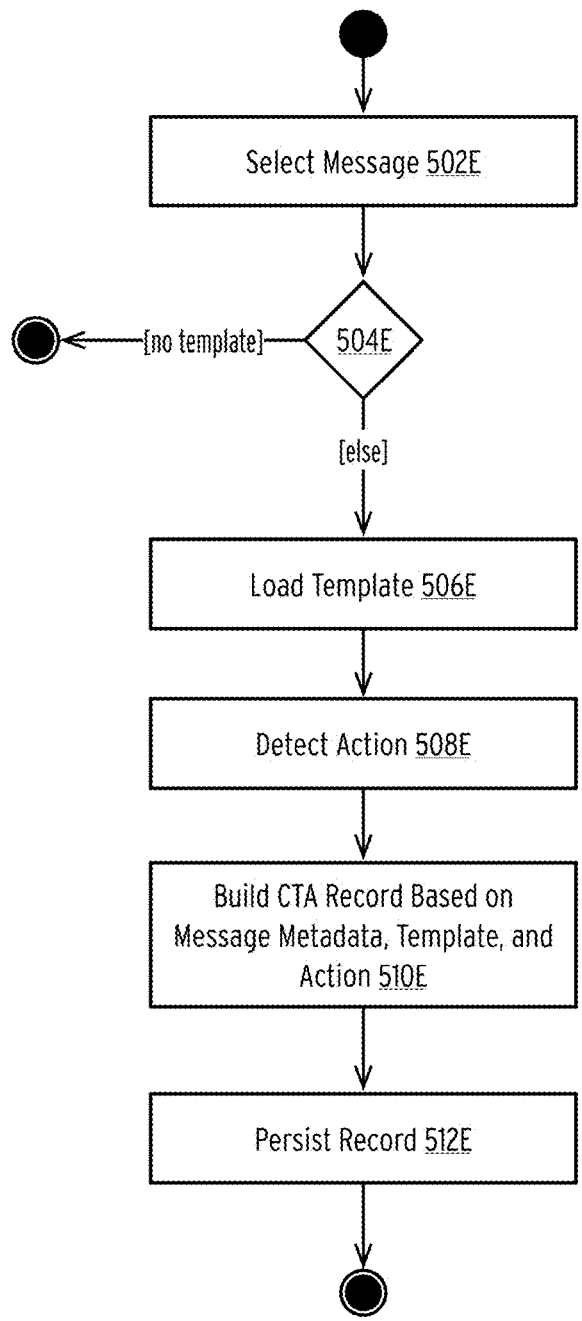
FIG. 5E is a flow diagram of a method for building a call to action database according to some embodiments of the disclosure.
Figure 5F:
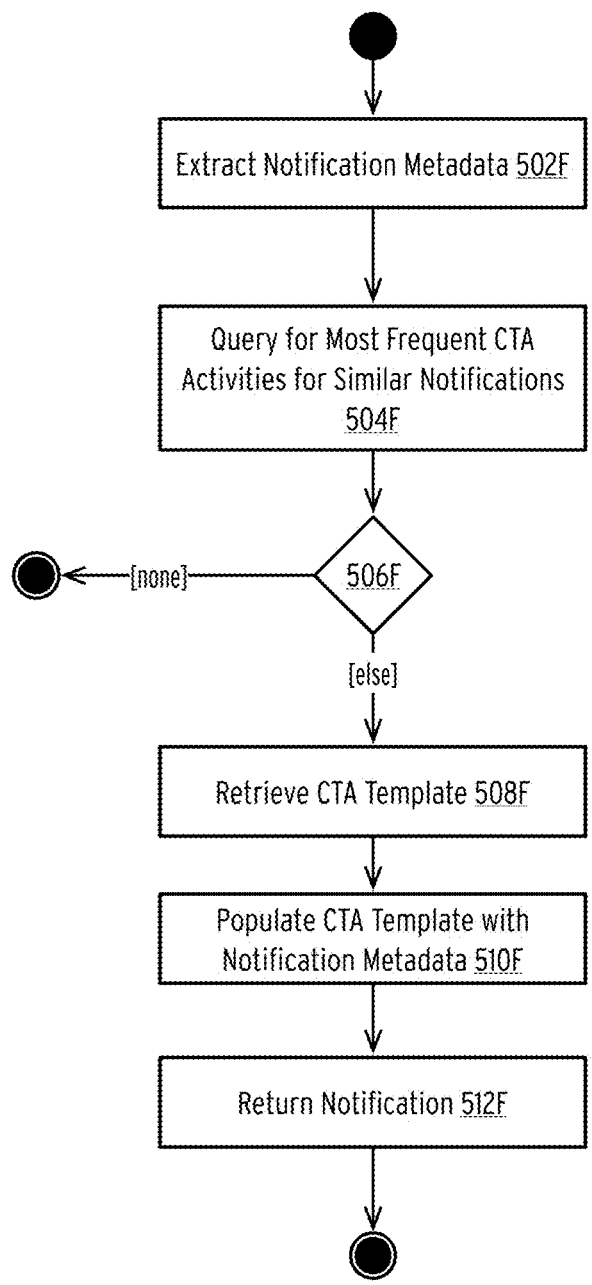
FIG. 5F is a flow diagram of a method for generating a new notification according to some embodiments of the disclosure.

Details of the parameter extraction unit (222), query engine (226), decision engine (230), and notification builder (234) are described more fully in FIGS. 3, 5A, and 5F, which are not repeated herein.

FIG. 3 is a block diagram of a device for generating new notifications according to some embodiments of the disclosure.

In the illustrated embodiment, the notification builder (234) receives a raw notification (220) and query results (236). As discussed previously, the query results (236) comprise the outputs of various activity databases returned in response to a query generated based on the raw notification (220).

A data extraction unit (302) processes the raw notification (220) and extracts data needed for a given CTA template. The template query engine (304) receives the raw notification (220) and query results (236) and queries a database (306) of CTA templates to load the optimal CTA template. Details of these operations are provided in FIG. 5F.

After identifying the appropriate template, the template query engine (304) transmits the identified template to a template processor (308), which constructs a personalized notification (232) using the data extracted by the data extraction unit (302). Details of this process are also provided in FIG. 5F as well as FIG. 5A and are not repeated herein.

FIG. 4 is a block diagram of a database scheme used by activity databases and queried to enhance notifications according to some embodiments of the disclosure.

In the illustrated embodiment, the notification activity database (210) and message activity database (212) include records that each have a conversation identifier field, sender identifier field, action field, and priority indicator. In the illustrated embodiment, the conversation identifier field comprises a unique identifier for a given message received by a user. Thus, as illustrated, the email received from "joe@example.com" is assigned a conversation identifier of "123" by the messaging service, and this conversation identifier is included in both databases (210, 212). In some embodiments, the conversation identifier field may be used to join records and improve the priority indicator. For example, if a message activity record indicates high priority and a corresponding notification activity record indicates low priority, the method may update the corresponding notification activity record as a high priority record.

In the notification activity database (210) and the message activity database (212), each record is associated with a recorded action. This action is dependent on the modality used (notification vs. message) and is not limited to specific actions. As illustrated, the action types in the notification activity database (210) may comprise actions undertaken with notifications such as clicking or ignoring. In some systems, notifications may allow for other actions such as click on buttons or other interactions, which may also be recorded. The message activity database (212) can include any action associated with messages such as email or instant messages. As illustrated, examples of actions include reading, starring, deleting, triaging, and replying. Other types of actions include forwarding, sending, copying, labeling, etc.

Finally, each record in the notification activity database (210) and message activity database (212) includes a priority indicator that is generated based on the underlying action. Details of generating the priority indicators are described more fully in FIGS. 5B, and 5C and the disclosure of both are not repeated herein, but reference is made to those descriptions.

The illustrated embodiment depicts one example of a contact activity database (214). In the illustrated embodiment, the contact activity database (214) includes a unique identifier for each record, a contact identifier (e.g., email address, username, etc.), and a classification field. The classification field may be generated based on monitoring the user's interactions with the contact, as described in more detail in FIG. 5D.

Finally, the CTA activity database includes records associated with actions taken by users with messages or notifications. As illustrated, a type field is used to record the type of message/notification, and a sender field is used to store a canonical sender of the message/notification. In the illustrated embodiment, each record is categorized. In one embodiment, the categorization can be performed based on the value of the sender field. A user identifier is additionally stored for each record. In the illustrated embodiment, the user identifier comprises an email address associated with the message/notification, however other identifiers may be used. Finally, an action field is stored, which reflects the underlying action performed by the user with respect to the message/notification. Details of generating a CTA record are described more fully in the description of FIG. 5E and are not repeated herein.

FIG. 5A is a flow diagram of a method for enhancing notifications according to some embodiments of the disclosure.

In step 502a, the method receives a notification. In various instances, the notification received in step 502a is referred to as the "incoming notification."

In the illustrated embodiment, a notification comprises a data structure for display on a computing device. In one embodiment, a notification includes data such as text or images to be displayed on the client device. Alternatively, or in conjunction with the foregoing, the notification may include metadata regarding the notification such as a conversation identifier, username or email address, etc. Using an email application on a mobile device as an example, the application may generate a notification to display new messages as they arrive. Such a notification may include data to display, including a sender name, a subject line, a portion of the email body, and a user avatar. The notification, when displayed, may include system-generated data fields such as a title bar, including the application name and a human-readable timestamp.

In one embodiment, the method executes on a mobile device (e.g., mobile phone, tablet, etc.) or other personal computing device (e.g., laptop, desktop, etc.). In this embodiment, the method may be performed by an operating system of the device or by an application running on the device. Generally, the operations are similar; however, if executed by the operating system, the method may be performed for all notifications. In contrast, if a single application is executing the method, the notifications processed are associated with that single application. In some embodiments, the method may be executed by a library that has access to multiple, but not all, applications on a device. For example, an organization may deploy multiple applications to mobile devices, and the library may access all notifications associated with that organization's applications. In this scenario, data may be aggregated or federated to improve performance. As an example, a user device may include a chat application and email application associated with a single organization. Both applications may utilize a library that implements the methods described herein and processes notifications from both applications.

In another embodiment, the method executes on a server device. In this embodiment, a server device is used to generate notifications to push to other computing devices. In this scenario, the method will execute prior to pushing notifications to individual users. Thus, the method (as will be described) may selectively ignore and transmit notifications to client devices while client devices may remain unchanged. Notably, this embodiment decreases network usage by only transmitting high priority notifications and allows for unchanged mobile applications and devices. However, it necessarily is not capable of processing all notifications on a client device since at least some notifications are generated locally on the client device. To remedy this, in some embodiments, modified applications on the client device may be configured to allow a server device to control notification generation. For example, a mail application may be configured to receive a new mail message from the server and determine if the mail server has flagged this new message as not requiring notifications. Client code may then bypass a notification generation routine for the flagged message.

In some embodiments, a hybrid architecture may be employed. For example, a client device may perform the method depicted in FIG. 5A, and other figures, and may periodically synchronize the activity databases with a central server. The central server may then perform various operations on the databases such as aggregating data from multiple users, performing error correction, identifying false positives or negatives, using the databases for training machine learning (ML) or artificial intelligence (AI) models, or various other features. In one embodiment, the central server can use the databases to generate an ML/AI model for a user. In this example, activity databases include data and priority flags. The priority flags are used as the output and the remaining data used as the input. A neural network can then be trained to predict a priority flag for a given set of inputs. In one embodiment, this can be done on a per-user basis, while in other embodiments data for multiple users can be combined to form a single global training set.

In step 504a, the method extracts query parameters from the notification.

In the illustrated embodiment, the query parameters comprise data or metadata included in the notification. The type of data or metadata used for querying depends on the underlying activity database. For example, the query parameter for a notification activity store that stores data for a messaging application may comprise a sender identifier (e.g., username or email address). Other values and types of values may be used, and the disclosure is not limited to using a specific query parameter. However, the query parameter should generally comprise some data or metadata included in the notification itself and not global values.

In step 506a, the method queries activity databases for priority indicators.

As described above, and in more detail in FIGS. 5B-5E, an activity database maintains flagged records. Each record includes a set of fields and a priority indicator. In the illustrated embodiment, the method issues a query to one or more of the activity databases to return a value. In the illustrated embodiment, the method generates a query (e.g., a structured query language (SQL) query) and issues the query to each of the databases. In one embodiment, the query identifies the query parameter to be searched and the value to identify. For example, the method may request all notifications for the sender "joe@example.com" from the notification activity database.

In step 508a, the method determines if the notification received in step 502a is a high priority or low priority notification based on the results of the querying in step 506a.

In one embodiment, the results of the queries in step 506a comprise a set of records, each record having a priority indicator (e.g., "high" or "low"). In step 508a, the method aggregates these priority indicators to determine if the instant notification is a high priority notification. In one embodiment, the method tallies the number of high priority records and the number of low priority records. The method can then use various techniques for determining whether the current notification should be labeled as a high priority notification.

In one embodiment, the method determines if the number of high priority records exceeds a fixed threshold. If so, the method ignores the low priority records and flags the incoming notification as a high priority notification. This embodiment is designed to capture all potentially high priority notifications, despite potential false positives. In this embodiment, the method may bypass analyzing or querying for low priority records.

In another embodiment, the method may determine if the number of high priority records is greater than the number of low priority records by a fixed value. In this embodiment, the method subtracts the number of low priority records from the number of high priority records and determines if the result exceeds a non-negative value representing the threshold.

In another embodiment, combined with the foregoing, the method may weight the high priority and low priority records based on the underlying database. For example, a high priority message activity record may be weighted double that of a notification activity record.

In one embodiment, the method aggregates all of the priority indicators from all of the databases prior to performing the above comparisons. In another embodiment, the method performs the above comparisons for each database generating a set of N results, each result indicating whether the computation performed on a given database returns a high or low priority value. In this embodiment, the method may then combine the results to generate a final, single value. For example, a high priority result from a database may be treated as a logical one (1), while a low priority result is treated as a logical zero (0). The method may then OR the results to determine whether the final priority indicator should be high (1) or low (0). In this manner, a high priority result from a single database may cause the method to flag the notification as a high priority notification. Conversely, the method may logically AND the results. In this manner, only high priority results from all databases cause the method to flag the notification as a high priority notification. Alternatives may exist coming OR and AND operations. For example, a first subset of database results may be logically OR'd and the result logically AND'd to a single database. In this embodiment, the method requires that at least one database in the first subset return a high priority result and then requires that the single database also return a high priority result before marking the incoming notification as high priority. Other combinations of OR and AND operations may be used.

In step 510a, the method has determined that the result of step 508a is a low priority flag. In response to detecting this, the method ignores the incoming notification, and the method ends the processing of the incoming notification.

In step 512a, alternatively, if the method determined that the result of step 508a is a high priority flag, the method in step 514a then determines if a notification template is available.

In one embodiment, a notification template comprises a pre-formatted notification that includes one or more placeholders for the input of data. In the illustrated embodiment, the method queries a database of templates using data or metadata of the incoming notification.

In one embodiment, the method uses a series of patterns to classify the incoming notification. For example, the method may extract a header or title of the notification and the application name and use these two values to identify a corresponding template. Alternatively, the method may search the data or metadata for a known pattern (e.g., words, phrases, etc.) in the incoming notification and classify the incoming notification based on the matching of the pattern. Alternatively, a mobile application may be configured to programmatically identify notification types and flag the incoming notification with such a type. In this scenario, the method extracts the type and identifies a template based on the type.

As an example, a mail application may receive a new email from an online retailer. The mail application generates a new email notification that includes the sender (e.g., email and display name), subject, and body. The subject line may include the text "You Order Confirmation is Attached." The method detects this subject and classifies the email as an order confirmation. The method then queries for a CTA template for an order confirmation template that matches the sender.

In one embodiment, the selection of a CTA template is personalized based on the user associated with the notification. As is described in more detail in FIG. 5E, a CTA activity database is maintained to record the actions a user takes with specific types of email from specific senders. CTA templates are generated based on these actions for each sender. In the illustrated embodiment, the method queries the CTA activity database to identify the most common actions a user has taken with the same sender and/or email type.

In step 514a, the method modifies the notification based on the template identified in step 512a.

In one embodiment, the method modifies the contents of the incoming notification or the metadata of the incoming notification. In another embodiment, the method extracts data from the incoming notification and generates a new notification.

In some embodiments, the method may modify, add, or remove, text content of the incoming notification based on the CTA template. Alternatively, or in conjunction with the foregoing, the method may modify, add, or remove image content to the incoming notification based on the CTA template. Alternatively, or in conjunction with the foregoing, the method modifies the metadata of the message. For example, the incoming notification may include a deep link or similar metadata that directs the user to a specific page of a mobile application. In one embodiment, the method can modify this deep link to point to, for example, a third-party website or other destination based on the CTA template. Other features of the notification may be added, removed, or modified. For example, a button or other selectable user interface element may be added to the notification based on the CTA.

The following example provides further detail regarding the modification of a notification as described in steps 512a and 514a. In this example, a mail application receives an order confirmation from a retailer. As part of the CTA activity analysis (described in FIG. 5E), the method identifies that a user frequently selects a hyperlink in the sender's order confirmation email to view the order detail. Similarly and alternatively, the method could determine that the user frequently selects a hyperlink to view tracking information. Thus, the method stores this frequently executed call to action in the CTA activity database and uses it to identify the most frequent CTA performed by the user for the sender and order confirmation. The method then queries a database of CTA templates to identify whether a template exists for a given preferred action, sender, and email type. In response, the method may retrieve a template that modifies the action target (e.g., the resource directed to when interacting with the notification) to point directly to an order detail page. This is in contrast to the standard target of viewing the email itself. The method then returns the modified notification to the user.

In some embodiments, the method may not identify a template for every notification. Thus, if such a determination is made in step 512a, the method proceeds directly to step 516a.

In step 516a, the method generates and, in some embodiments, displays the modified or original notification. In a server-based embodiment, the method may generate the final, packaged notification and transmit that notification to a client. Alternatively, in a client-based embodiment, the method may generate the final structure of the notification and instruct the mobile device (e.g., operating system or similar software) to display the generated notification. Specific details on how to display notifications on a client device are necessarily platform-specific and are not described in detail herein.

In some embodiments, the method monitors whether the user interacts with the notification and records this result. The method can then use the monitored action to determine whether the modified notification was successful (i.e., a user interacted with the notification). The method may use this data to refine any of the aforementioned steps.

FIG. 5B is a flow diagram of a method for building a notification activity database according to some embodiments of the disclosure.

In step 502b, the method receives a notification. In the illustrated embodiment, the receipt of a notification can be performed in a similar manner as described in the description of step 502a, the description of which is not repeated.

In one embodiment, the notification received in step 502b is received in response to a user action or inaction. Specifically, the notification may be received by the method after the notification was displayed to the user. If the user interacts (e.g., taps or clicks) on the notification, the method receives an augmented notification that includes the action taken. Alternatively, the method transmits a notification with an indication that the notification was ignored (or blocked) if the user does not interact with the notification (or the notification was never displayed).

In step 504b, the method extracts notification metadata. In one embodiment, the notification metadata may comprise a conversation identifier and a sender identifier (e.g., username, email address, unique identifier, etc.). In one embodiment, the method additionally extracts an action or inaction taken by the user in response to the notification. In one embodiment, the action may comprise an action such as "click," "touch," "tap," "select," etc. In one embodiment, an inaction may comprise a flag that the notification was ignored. Alternatively, or in conjunction with the foregoing, an inaction may comprise an active dismissal of the notification by the user.

In one embodiment, the method may automatically categorize all notifications, initially, as ignored. Then, the method ties one or more event handlers to an action of the notification and only updates the status when a user interacts with the notification. For example, the method may attach an event handler to an event where a user selects the notification. When the user selects the notification the event handler is called and changes the status of the notification to clicked or touched.

In some embodiments, other statuses may be used. For example, a new email notification may allow a user to delete as well as view a message. In this embodiment, the delete action can be detected (e.g., via an event handler on a button) and extracted in step 504b. As will be described, such an event (delete) may be considered a negative event and used to classify the notification as low priority.

In step 506b, the method creates a notification record from the metadata. In one embodiment, the method packages the extracted fields from step 504b into a single record. In one embodiment, a record comprises a row of a relational database (such as that depicted in FIG. 4). Other databases and data stores may require different record formats, and the specific format is not limited. In general, a record comprises a self-contained record of the notification and action taken thereon. As illustrated in FIG. 4, as one example, a mail application may generate a record that includes the conversation identifier, sender identifier, and an action type (e.g., clicked, ignored, deleted, etc.).

In step 508b, the method then analyzes the action type to determine how to classify the notification. In one embodiment, the method maintains a mapping of actions to priority indicators. For instance, a "click" event maps to a high priority indicator while an "ignore" inaction maps to a low priority indicator. In one embodiment, if the action type is not recognized, the method may classify the notification as low priority by default.

In step 510b, the method marks the record as high priority if the action type maps to a high priority action. Conversely, in step 512b, the method marks the record as low priority if the action type maps to a lower priority action.

In one embodiment, symbolic flags or enumerated types are used as priority indicators. Alternatively, numeric values may be used to represent the priority of a notification. In one embodiment, the priority is a continuous value (e.g., between zero and one) that presents the likelihood that a notification is a high priority notification.

In the illustrated embodiment, the priority indicator is written to a field of the record. In step 514b, the method persists (stores) the completed record to a non-volatile storage location. As discussed above, this location may comprise a database or similar data store.

In the illustrated embodiment, the method will repeatedly execute for multiple notifications. Ultimately, the method will populate a database of notifications and whether the user has positively or negatively interacted with the notifications. Since the records include data such as a sender identifier, the database can be used to classify future similar notifications (e.g., from the same sender) as described in FIG. 5A.

FIG. 5C is a flow diagram of a method for building a message activity database according to some embodiments of the disclosure.

In step 502c, the method receives a message associated with a messaging application. The messaging application may comprise an email application, instant message application, or similar application. In one embodiment, the method is performed locally on a client device running the messaging application. Alternatively, the method may be performed by a server hosting the data used by the messaging application (e.g., a mail server or instant message server).

In step 504c, the method extracts message metadata. In one embodiment, the message metadata may comprise a conversation identifier and a sender identifier (e.g., username, email address, unique identifier, etc.). In one embodiment, the method additionally extracts an action or inaction taken by the user in response to the message. In one embodiment, the action may comprise an action such as read, star, delete, triage, reply, forward, etc. In one embodiment, an inaction may comprise a flag that the message was ignored (e.g., unread). In one embodiment, the method may automatically categorize all messages, initially, as ignored and updates the actions as they are detected.

In a server-side embodiment, the method receives network requests, including actions (e.g., read, star, delete, etc.) in order to process the actions for the user. In these embodiments, in addition to performing the requested action, the method updates the action taken with respect to the message. In one embodiment, the method records all actions for a single event; thus, multiple records may be created for the same message. For example, a single message may be associated with two records: one recording a read action and a second, later one recording a delete action. In another embodiment, the method only maintains a single record for the message and updates the action as the user performs actions.

In a client-side embodiment, the method ties one or more event handlers to the message and updates the status of the message when a user interacts with the message in the application. For example, the method may attach an event handler to an event where a user reads or deletes the message. When the user reads or deletes the message, the corresponding event handler is called and changes the status of the message based on the action.

In step 506b, the method creates a message activity record from the metadata and action. In one embodiment, the method packages the extracted fields from step 504c into a single record. In one embodiment, a record comprises a row of a relational database (such as that depicted in FIG. 4). Other databases and data stores may require different record formats, and the specific format is not limited. In general, a record comprises a self-contained record of the message and action taken thereon. As illustrated in FIG. 4, as one example, a mail application may generate a record that includes the conversation identifier, sender identifier, and an action type (e.g., read, starred, deleted, triaged, moved, unread, etc.).

In step 508c, the method then analyzes the action type to determine how to classify the message (and, by proxy, sender). In one embodiment, the method maintains a mapping of actions to priority indicators. For instance, read, star, or reply events map to high priority indicators while delete and triage actions map to low priority indicators. In one embodiment, if the action type is not recognized, the method may classify the message as low priority by default.

In step 510c, the method marks the record as high priority if the action type maps to a high priority action. Conversely, in step 512c, the method marks the record as low priority if the action type maps to a lower priority action.

In one embodiment, symbolic flags or enumerated types are used as priority indicators. Alternatively, numeric values may be used to represent the priority of a message. In one embodiment, the priority is a continuous value (e.g., between zero and one) that presents the likelihood that a message is a high priority message or from a high priority sender.

In the illustrated embodiment, the priority indicator is written to a field of the record. In step 514*c*, the method persists (stores) the completed record to a non-volatile storage location. As discussed above, this location may comprise a database or similar data store.

In the illustrated embodiment, the method will repeatedly execute for multiple messages. Ultimately, the method will populate a database of messages and whether the user has positively or negatively interacted with the messages. Since the records include data such as a sender identifier, the database can be used to classify future similar messages (e.g., from the same sender) as described in FIG. 5A.

FIG. 5D is a flow diagram of a method for building a contact activity database according to some embodiments of the disclosure.

In step 502*d*, the method monitors messaging activity with a plurality of contacts. In some embodiments, the method may be performed locally in a messaging application. In other embodiments, the method may be performed by a messaging server having access to messaging activity.

In one embodiment, monitoring the messaging activity comprises analyzing the communications between senders and recipients. Specifically, a given user's messaging activity is monitored to identify other users (also referred to as contacts) that the user communicates with.

In step 504*d*, the method records positive and negative interactions taken by the user with their contacts. In the illustrated embodiment, a positive interaction comprises an interaction that indicates that a user is interested in message content from a given contact. Examples of positive interactions include actions such as reading a message for a given contact, starring or favoriting a message from a given contact, or replying to a message from a given client. Conversely, a negative interaction comprises an interaction that indicates that a user is not interested in message content from a given contact. Examples of negative interactions comprise deleting messages from a contact, triaging messages (moving messages to a designated folder) from a contact, or leaving a contact's messages unread.

In some embodiments, step 504*d* further includes monitoring the user's proactive activities with the messaging service. For example, the method may monitor emails sent from the user to the contact and classify such an interaction as a positive interaction.

Ultimately, the method collects positive and negative indicators for each contact of a user. In step 506*d*, the method then determines if, for a given contact, the overall actions are positive, negative, or indeterminate.

In one embodiment, positive and negative interactions are counted, and the sum of each are used in the comparison in step 506*d*. In one embodiment, if the number of positive interactions exceeds a threshold, the method classifies the contact as a high priority contact in step 508*d*. Alternatively, if the number of negative interactions exceeds a second threshold, the method classifies the contact as a low priority contact in step 510*d*. In some embodiments, the method performs the comparisons serially and in a short-circuited manner. Thus, if a contact exceeds the positive threshold, the method classifies the contact as high priority (step 508*d*) and ends, bypassing the low priority comparison. The opposite ordering may also be implemented.

In other embodiments, the method balances positive and negative interactions to determine whether a contact is a high priority or low priority contact. In this embodiment, the method may determine if the number of positive interactions is greater than the number of negative interactions by a fixed value. In this embodiment, the method subtracts the number negative interactions from the number of positive interactions and determines if the result exceeds a non-negative value representing the threshold.

In another embodiment, combined with the foregoing, the method may weight the positive and negative interactions prior to aggregating and comparing the values. For example, a read action may be considered of lower weight than a star action.

In some embodiments, the method will not yet have accumulated enough actions to make a determination in step 506*d*. In this scenario, the method simply ignores the contact in step 512*d* and continues to accumulate interactions until a decision can be made in step 506*d*.

In step 514*d*, the method persists (stores) the contact to a non-volatile storage location. As discussed above, this location may comprise a database or similar data store. In one embodiment, two databases are used to store high priority and low priority contacts, and the method writes the contact to the appropriate database. In other embodiments, each contact is stored in a single database and a flag indicating the priority is updated accordingly.

In the illustrated embodiment, the method will repeatedly execute for multiple contacts, and until a decision can be made as to whether the totality of interactions with the contact can lead to a classification. Ultimately, the method will populate a database of contacts and whether the user has positively or negatively interacted with the contact. In the illustrated embodiment, the method may also be repeated periodically to update a classification of a previously classified contact.

FIG. 5E is a flow diagram of a method for building a call to action database according to some embodiments of the disclosure.

In step 502*e*, the method selects a message in a messaging application. In one embodiment, the selection in step 502*e* is made in response to a user opening a message (e.g., opening an email message).

In step 504*e*, the method attempts to load a template associated with the selected message. If no template can be identified, the method ends. If a template exists, the method loads the template in step 506*e*.

In the illustrated embodiment, the template may be identified based on matching the format of the message with a known format. For example, the method may maintain or access a database of templates for messages senders and subjects of such messages.

In one embodiment, the method uses a series of patterns to identify a template for the message. For example, the method may extract a subject line of the message and use the subject to identify a corresponding template. Alternatively, the method may search the data or metadata for a known pattern (e.g., words, phrases, etc.) in the message and select a template based on the matching of the pattern.

In one embodiment, the template comprises a set of actions that may be taken with respect to a message. For example, when receiving hotel booking related messages, there may be different actions including deleting the message, opening the link to view booking confirmation, opening the link to view reward points, calling the hotel, etc. Each of these actions may be stored as part of the template.

In step 508e, the method detects an action taken with respect to the message. In the illustrated embodiment, the method detects that an action included in the template was taken by the user. As one example, the template may store a set of uniform resource locator (URL) patterns associated with actions and determine that a messaging application is attempting to load such a URL after a user view a message. This may indicate the performance of an action in step 506e.

In step 510e, the method builds a CTA record using the message metadata, template, and action. In one embodiment, the CTA record includes properties of the underlying message such as a sender identifier (e.g., email or username) as well as a human-readable sender name (e.g., full name or company name). The CTA record may additionally include a type of message (e.g., booking confirmation, receipt, uncategorized, etc.). In some embodiments, the method may further include a categorization of the sender or email (e.g., travel, e-commerce, personal, etc.). Finally, the CTA record includes the detected action (e.g., place a phone call to sender, view tracking information, view rewards points, etc.).

In step 512e, the method persists (stores) the completed record to a non-volatile storage location. As discussed above, this location may comprise a database or similar data store.

In the illustrated embodiment, the method will repeatedly execute for multiple messages. Ultimately, the method will populate a database of CTA records that record how a user interacts with a message. In some embodiments, the CTA records overlap with the records generated in FIG. 2C. For example, when a user reads a message, the method of FIG. 2C records a positive user interaction while the method in FIG. 2E continues to analyze the actions taken by the user. As a result, the persisted records generate a view into the most common actions a user takes with respect to specific senders and, in some embodiments, to specific types of messages. Thereafter, for any such messages that are similar to known messages (or are from similar or the same sender), that same call to action would be tagged for the user. A system could then update the message list user interface or notification to present the action directly on the message list, so the user no longer needs to open the message.

FIG. 5F is a flow diagram of a method for generating a new notification according to some embodiments of the disclosure.

In step 502f, the method extracts notification metadata. In one embodiment, the notification metadata may comprise a conversation identifier and a sender identifier (e.g., username, email address, unique identifier, etc.). In one embodiment, the method additionally extracts an action or inaction taken by the user in response to the notification. In one embodiment, the action may comprise an action such as "click," "touch," "tap," "select," etc. In one embodiment, an inaction may comprise a flag that the notification was ignored. Alternatively, or in conjunction with the foregoing, an inaction may comprise an active dismissal of the notification by the user.

In one embodiment, the method may automatically categorize all notifications, initially, as ignored. Then, the method ties one or more event handlers to an action of the notification and only updates the status when a user interacts with the notification. For example, the method may attach an event handler to an event where a user selects the notification. When the user selects the notification the event handler is called and changes the status of the notification to clicked or touched.

In some embodiments, other statuses may be used. For example, a new email notification may allow a user to delete as well as view a message. In this embodiment, the delete action can be detected (e.g., via an event handler on a button) and extracted in step 504b. As will be described, such an event (delete) may be considered a negative event and used to classify the notification as low priority.

In step 504f, the method queries for most frequent CTA activities for similar notifications.

In one embodiment, the metadata is used to form a search query to query the CTA activity database described above. For example, a sender identifier (e.g., email address, username) can be used to find CTA activities stored in the database that match the sender. The method then groups the returned records and aggregates similar records by a key field (e.g., the "action" field in FIG. 4). The method then selects the value of the key field associated with the most records to identify the most frequently occurring action taken in response to a notification.

In step 506f, the method determines if there is a clear action that is taken in response to the notification. In one embodiment, the method will only select an action if the number of CTA activity records associated with that action exceeds a pre-configured threshold.

In step 508f, the method loads the CTA activity template from a database of CTA templates. In one embodiment, the CTA templates are associated with senders of messages as well as actions. Thus, for each sender/action pair, a CTA template exists. In one embodiment, the template comprises a set of fixed or fixable values (e.g., static text or partially static text requiring interpolation of variable data) as well as placeholders.

In step 510f, the method populates the CTA template with notification metadata. In one embodiment, the method first fills any empty placeholders (e.g., title, body content, etc.) with data from the original notification. The method may then fill any interpolated fields with data from the notification. For example, the template may have a URL that is associated with a specific order number: "http://example.com/orders/:id," where ":id" is a placeholder to be interpolated with an order identifier. The method may scrape the notification and identify an order identifier (e.g., appearing in the title of the notification) and insert the identifier into the URL, interpolating the value. As described previously, such links may be used as action targets for users clicking on or otherwise selecting a notification.

In step 512f, the method returns the notification to the client device for display. As described above, in some embodiments, when executing on the client device, the method may proceed to display the personalized notification. In a server-side embodiment, the method may instead transmit the notification to a specific client device.

Although the foregoing method was described primarily in the context of notifications, the method may also be applied to messages themselves. As one example, email messages may be analyzed to determine a most frequent CTA. Upon identifying the most common CTA, the method may add a user interface (UI) element to a messaging application to display the CTA. For example, a button may be placed on the email in a list view to allow the user to immediately select the CTA without opening the email.

Figure 6:
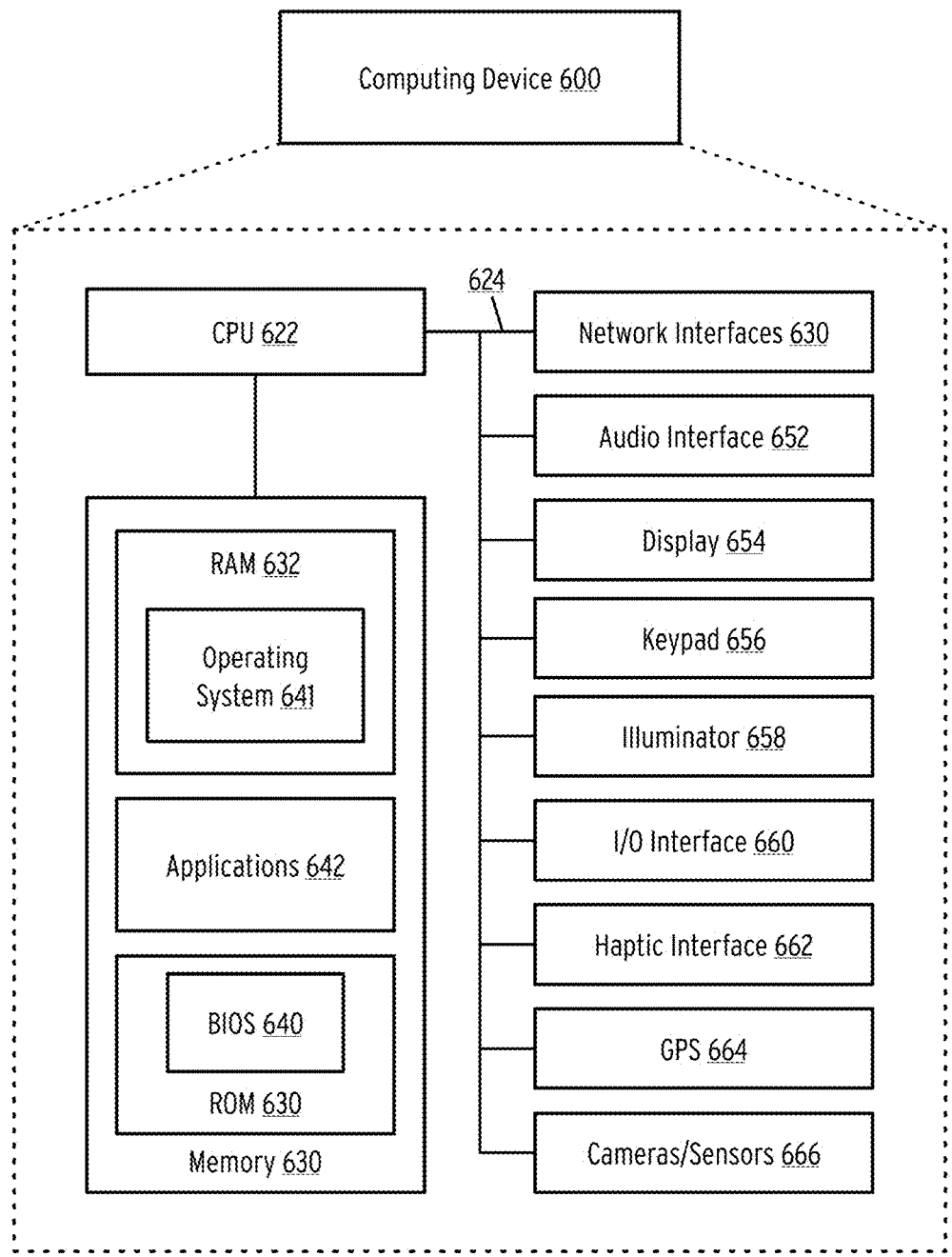
FIG. 6 is a block diagram illustrating a computing device showing an example embodiment of a computing device used in the various embodiments of the disclosure.

FIG. 6 is a block diagram illustrating a computing device showing an example embodiment of a computing device used in the various embodiments of the disclosure. The computing device (600) may include more or fewer components than those shown in FIG. 6. For example, a server computing device may not include audio interfaces, displays, keypads, illuminators, haptic interfaces, GPS receivers, cameras, or sensors.

As shown in the figure, the device (600) includes a processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666), or a plurality of cameras/sensors (666), as understood by those of skill in the art. The positioning of the camera(s)/sensor(s) (666) on the device (600) can change per device (600) model, per device (600) capabilities, and the like, or some combination thereof.

The computing device (600) may optionally communicate with a base station (not shown), or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises input/output interface (660) for communicating with external devices, using communication technologies, such as USB, infrared, Bluetooth®, or the like. The haptic interface (662) provides tactile feedback to a user of the client device.

Optional GPS transceiver (664) can determine the physical coordinates of the computing device (600) on the surface of the Earth, which typically outputs a location as latitude and longitude values. GPS transceiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may through other components, provide other information that may be employed to determine a physical location of the device, including, for example, a MAC address, Internet Protocol (IP) address, or the like.

Mass memory (630) includes a RAM (632), a ROM (634), and other storage means. Mass memory (630) illustrates another example of computer storage media for storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600)

Applications (642) may include computer-executable instructions which, when executed by the computing device (600), perform any of the methods (or portions of the methods) described previously in the description of the preceding Figures. In some embodiments, the software or programs implementing the method embodiments can be read from hard disk drive (not illustrated) and temporarily stored in RAM (632) by CPU (622). CPU (622) may then read the software or data from RAM (632), process them, and store them to RAM (632) again.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

In this description, various functions and operations may be described as being performed by or caused by software code to simplify description. However, those skilled in the art will recognize what is meant by such expressions is that the functions result from execution of the code by one or more processors, such as a microprocessor, application specific integrated circuit (ASIC), graphics processor, and/or a field-programmable gate array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (TOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., an FPGA, an ASIC, etc.), a system on a chip (SoC), or another suitable processor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving, by a processor, a notification;
   extracting, by the processor, one or more query parameters from the notification;
   in response to receiving the notification, querying, by the processor, at least one activity database using the query parameters, the activity database comprising data regarding historical interactions of a user;
   generating, by the processor, a priority indicator in response to the querying by aggregating priority levels of results of the querying;
   determining, by the processor, that the priority indicator indicates a high priority;
   generating, by the processor, a second notification in response to determining that the priority indicator indicates the high priority, the second notification generated by:
      querying, by the processor, a call to action activity database to identify similar call to action responses,
      loading, by the processor, a call to action template using the identified similar call to action responses, and populating, by the processor, the call to action template with data extracted from the notification to generate the second notification; and displaying, by the processor, the second notification.

2. The method of claim 1, further comprising:
determining, by the processor, that the priority indicator indicates a low priority; and
ignoring, by the processor, the notification when the priority indicator indicates the low priority.

3. The method of claim 1, wherein querying the at least one activity database comprises:
querying multiple activity databases; and
combining query results of querying the multiple activity databases to generate the priority indicator.

4. The method of claim 3, wherein the multiple activity databases include a notification activity database and the method further comprises building the notification activity database by:
receiving, by the processor, a third notification;
building, by the processor, a record based on data of the third notification;
marking, by the processor, the record as high priority if the user interacted with the third notification;
marking, by the processor, the record as low priority if the user did not interact with the third notification; and
storing, by the processor, the record in the notification activity database.

5. The method of claim 3, wherein the multiple activity databases include a message activity database and the method further comprises building the message activity database by:
receiving, by the processor, a message;
building, by the processor, a record based on data of the message;
marking, by the processor, the record as high priority if a positive action was received for the message, the positive action comprising an interaction with a messaging application selected from the group consisting of a read, star, and reply interaction;
marking, by the processor, the record as low priority if a negative action was received for the message, the negative action comprising an interaction with a messaging application selected from the group consisting of a delete and triage interaction; and
storing, by the processor, the record in the message activity database.

6. The method of claim 3, wherein the multiple activity databases include a contact activity database and the method further comprises building the contact activity database by:
monitoring, by the processor, messaging activity of a messaging application;
recording, by the processor, positive and negative interactions undertaken with contacts associated with the messaging activity;
classifying, by the processor, a contact as a high priority contact if a number of positive interactions exceeds a first threshold;
classifying, by the processor, the contact as a low priority contact if a number of negative interactions exceeds a second threshold; and
storing, by the processor, the contact in the contact activity database.

7. The method of claim 3, wherein the multiple activity databases include a call to action activity database and the method further comprises building the call to action activity database by:

selecting, by the processor, a message in a messaging application;
loading, by the processor, a template associated with the message;
detecting, by the processor, an action undertaken by the user with the message;
building, by the processor, a record based on metadata of the message, the template, and the action; and
storing, by the processor, the record in the call to action activity database.

8. A non-transitory computer-readable storage medium for tangibly storing computer program instructions capable of being executed by a processor, the computer program instructions defining steps of:
receiving, by the processor, a notification;
extracting, by the processor, one or more query parameters from the notification;
querying, by the processor, at least one activity database in response to receiving the notification, the activity database comprising data regarding historical interactions of a user;
generating, by the processor, a priority indicator in response to the querying by aggregating priority levels of results of the querying;
determining, by the processor, that the priority indicator indicates a high priority;
generating, by the processor, a second notification in response to determining that the priority indicator indicates the high priority, the second notification generated by:
querying, by the processor, a call to action activity database to identify similar call to action responses,
loading, by the processor, a call to action template using the identified similar call to action responses, and
populating, by the processor, the call to action template with data to generate the second notification; and
displaying, by the processor, the second notification.

9. The computer-readable storage medium of claim 8, the computer program instructions further defining the steps of:
determining, by the processor, that the priority indicator indicates a low priority; and
ignoring, by the processor, the notification when the priority indicator indicates the low priority.

10. The computer-readable storage medium of claim 8, wherein querying the at least one activity database comprises:
querying multiple activity databases; and
combining query results of querying the multiple activity databases to generate the priority indicator.

11. The computer-readable storage medium of claim 10, wherein the multiple activity databases include a notification activity database and the computer program instructions further defining the step of building the notification activity database by:
receiving, by the processor, a third notification;
building, by the processor, a record based on data of the third notification;
marking, by the processor, the record as high priority if the user interacted with the third notification;
marking, by the processor, the record as low priority if the user did not interact with the third notification; and
storing, by the processor, the record in the notification activity database.

12. The computer-readable storage medium of claim 10, wherein the multiple activity databases include a message activity database and the computer program instructions further defining the step of building the message activity database by:

receiving, by the processor, a message;

building, by the processor, a record based on data of the message;

marking, by the processor, the record as high priority if a positive action was received for the message, the positive action comprising an interaction with a messaging application selected from the group consisting of a read, star, and reply interaction;

marking, by the processor, the record as low priority if a negative action was received for the message, the negative action comprising an interaction with a messaging application selected from the group consisting of a delete and triage interaction; and storing, by the processor, the record in the message activity database.

13. The computer-readable storage medium of claim 10, wherein the multiple activity databases include a contact activity database and the computer program instructions further defining the step of building the contact activity database by:

monitoring, by the processor, messaging activity of a messaging application;

recording, by the processor, positive and negative interactions undertaken with contacts associated with the messaging activity;

classifying, by the processor, a contact as a high priority contact if a number of positive interactions exceeds a first threshold;

classifying, by the processor, the contact as a low priority contact if a number of negative interactions exceeds a second threshold; and storing, by the processor, the contact in the contact activity database.

14. The computer-readable storage medium of claim 10, wherein the multiple activity databases include a call to action activity database and the computer program instructions further defining the step of building the call to action activity database by:

selecting, by the processor, a message in a messaging application;

loading, by the processor, a template associated with the message;

detecting, by the processor, an action undertaken by the user with the message;

building, by the processor, a record based on metadata of the message, the template, and the action; and storing, by the processor, the record in the call to action activity database.

15. A device comprising:

a processor; and a storage medium for tangibly storing thereon program logic for execution by the processor, the stored program logic comprising:

logic, executed by the processor, for receiving a notification;

logic, executed by the processor, for extracting one or more query parameters from the notification;

logic, executed by the processor, for querying at least one activity database in response to receiving the notification, the activity database comprising data regarding historical interactions of a user;

logic, executed by the processor, for generating a priority indicator in response to the querying by aggregating priority levels of results of the querying;

logic, executed by the processor, for determining that the priority indicator indicates a high priority;

logic, executed by the processor, for generating a second notification in response to determining that the priority indicator indicates the high priority, the second notification generated by:

querying a call to action activity database to identify similar call to action responses, loading a call to action template using the identified similar call to action responses, and populating the call to action template with data extracted from the notification to generate the second notification; and logic, executed by the processor, for displaying the second notification.

\* \* \* \* \*

UNITED STATES PATENT AND TRADEMARK OFFICE
CERTIFICATE OF CORRECTION

| | | |
|---|---|---|
| PATENT NO. | : 11,178,095 B1 | Page 1 of 1 |
| APPLICATION NO. | : 17/012567 | |
| DATED | : November 16, 2021 | |
| INVENTOR(S) | : Mohit Goenka et al. | |

It is certified that error appears in the above-identified patent and that said Letters Patent is hereby corrected as shown below:

On the Title Page (72), Inventors, delete "Mohita" and insert --Mohit--.

Signed and Sealed this
Fifth Day of December, 2023

Katherine Kelly Vidal
*Director of the United States Patent and Trademark Office*